United States Patent [19]
Pasut

[11] Patent Number: 5,655,747
[45] Date of Patent: Aug. 12, 1997

[54] SOLENOID VALVE FOR IRRIGATION CONTROL UNITS

[75] Inventor: Claudio Pasut, Pordenone, Italy

[73] Assignee: Claber S.p.a., Fiume Veneto, Italy

[21] Appl. No.: 569,608

[22] Filed: Dec. 8, 1995

[30] Foreign Application Priority Data

Dec. 14, 1994 [IT] Italy ................... MI94A2510

[51] Int. Cl.$^6$ .................. F16K 31/08; F16K 31/385; F16K 31/40
[52] U.S. Cl. .................. 251/30.03; 251/45; 251/65; 335/302
[58] Field of Search .................. 251/30.01, 30.02, 251/30.03, 30.04, 30.05, 45, 65, 129.15; 335/302, 306

[56] References Cited

U.S. PATENT DOCUMENTS

| | | | |
|---|---|---|---|
| 2,096,763 | 10/1937 | Ray et al. | 251/129.15 |
| 3,361,161 | 1/1968 | Schwartz | 251/65 |
| 3,593,956 | 7/1971 | McCarty, Jr. | 251/45 |
| 4,502,661 | 3/1985 | Swanson | 251/45 |
| 4,653,720 | 3/1987 | Knapp et al. | 251/65 |
| 4,844,112 | 7/1989 | Pick et al. | 251/30.03 |
| 4,948,090 | 8/1990 | Chen | 251/65 |
| 5,010,911 | 4/1991 | Grant | 251/65 |
| 5,145,145 | 9/1992 | Pick et al. | 251/30.03 |
| 5,299,775 | 4/1994 | Kolze | 251/45 |
| 5,464,041 | 11/1995 | Reinicke | 251/65 |

FOREIGN PATENT DOCUMENTS

| | | |
|---|---|---|
| 0 340 625 A1 | 8/1989 | European Pat. Off. |
| 2 602 299 | 5/1988 | France . |

*Primary Examiner*—George L. Walton
*Attorney, Agent, or Firm*—Nixon & Vanderhye, P.C.

[57] ABSTRACT

A solenoid valve for an irrigation control unit comprises a cut-off element movable inside a respective seat between a closed position and an open position. The cut-off element defines inside the seat a chamber in constant communication with the inlet of the solenoid valve, so that the pressure exerted on the cut-off element by the water present at the inlet of the solenoid valve is balanced by the pressure exerted on the cut-off element by the water present in the chamber. The cut-off element is provided with a passing conduit that can be opened so that the chamber can be put in communication with the outlet of the solenoid valve. Since the pressure exerted on the cut-off element by the water present at the inlet of the solenoid valve is no longer balanced by the pressure exerted on the cut-off element by the water present in the chamber, the cut-off element is displaced by the thrust of the water present at the inlet of the solenoid valve in said open position. The solenoid valve also comprises a bistable electromagnetic device comprising an electromagnetically-operated valve suitable for determining alternatively the closing and the opening of said passing conduit as a result of the generation of an electrical control impulse and up to the generation of an opposite electrical impulse.

7 Claims, 2 Drawing Sheets

SOLENOID VALVE FOR IRRIGATION CONTROL UNITS

BACKGROUND

I. Field of the Invention

The present invention relates to a solenoid valve for irrigation control units.

II. Related Art and Other Considerations

In the gardening sector, automatic timed irrigation systems provided with control devices that can be programmed by the user are becoming increasingly prevalent.

Such devices comprise substantially a control unit that operates one or more solenoid valves. The solenoid valves comprise a hydraulic element for cutting-off the flow of water, and an electromagnet for the operation of said hydraulic element.

Solenoid valves for irrigation control units should meet very specific requisites. For example, solenoid valves should have a small size, not require any maintenance, and have a very low consumption of electrical energy. Further, the solenoid valves should also operate with a very low water pressure (this occurs, e.g., when the water to be used for irrigation is provided by a tank where rain water is collected).

The object of the present invention is to provide a solenoid valve for irrigation control units that meets the above requisites.

SUMMARY

According to the present invention, such object is achieved with a solenoid valve (for, e.g., irrigation control units) which comprises a cut-off element movable inside a respective seat between a closed position and an open position. In the open position, one inlet of the solenoid valve communicates with an outlet of the same. The cut-off element defines inside said seat a chamber in constant communication with the inlet of the solenoid valve, so that the pressure exerted on the cut-off element by the water present at the inlet of the solenoid valve is balanced by the pressure exerted on the cut-off element by the water present in the chamber. The cut-off element is also provided with a passing conduit that can be opened so that said chamber can be put in communication with the outlet of the solenoid valve. Since the pressure exerted on the cut-off element by the water present at the inlet of the solenoid valve is no longer balanced by the pressure exerted on the cut-off element by the water present in the chamber, the cut-off element is displaced by the thrust of the water present at the inlet of the solenoid valve in said open position. The solenoid valve also comprises a bistable electromagnetic device comprising an electromagnetically-operated valve suitable for determining alternatively the closing and the opening of said passing conduit as a result of the generation of an electrical control impulse and up to the generation of an opposite electrical impulse.

A solenoid valve according to the present invention operates substantially on the difference in pressure between the inlet and a chamber that can be put in communication with the outlet; the valve is thus reliable and does not require any maintenance. The bistable electromagnetic device allows consumption to be greatly reduced, since the solenoid valve has to be powered only for short time intervals during its closing or opening operations, but once the solenoid valve has been opened or closed there is no longer any absorption of electrical power.

DETAILED DESCRIPTION OF EXEMPLARY EMBODIMENTS

The features of the present invention will be made more evident by the following detailed description of an embodiment thereof, described as a non-limiting example in the enclosed drawings, wherein.

Figure 1:
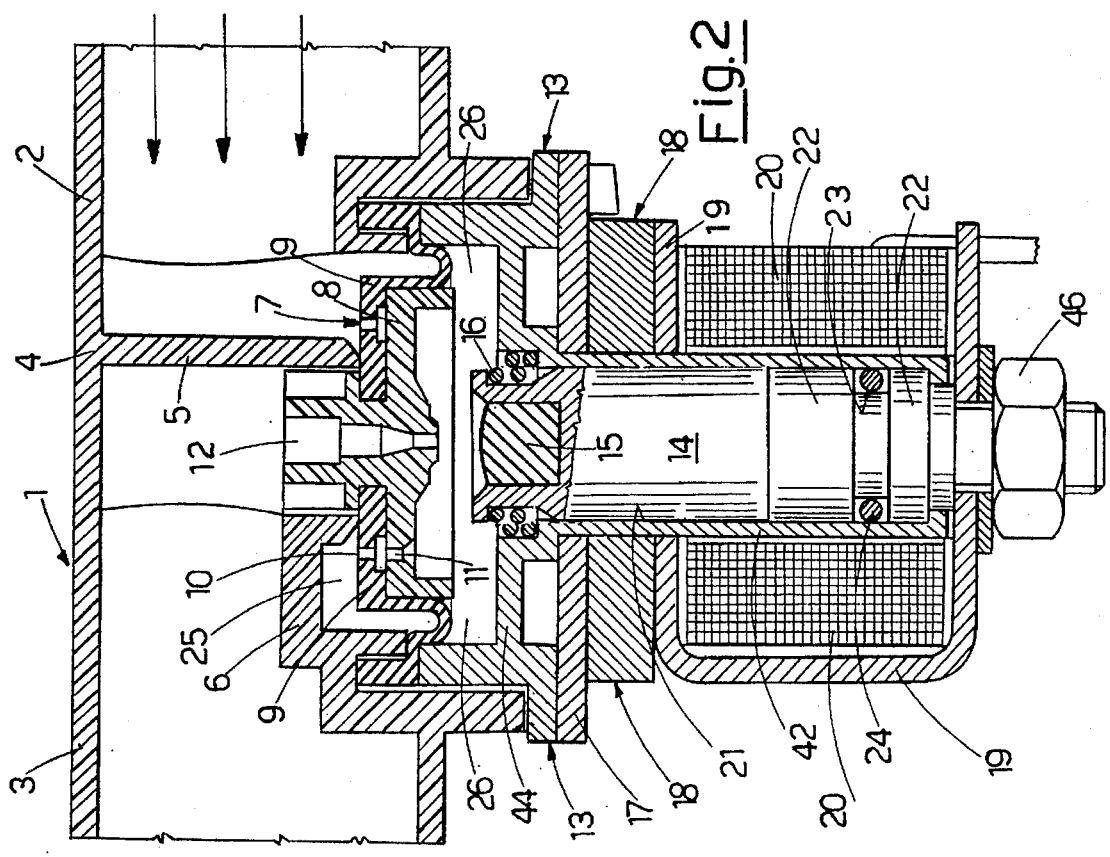
FIG. 1 shows a cross-section of a solenoid valve according to the present invention, in a closed condition.

As shown in FIG. 1, a solenoid valve according to the present invention comprises a hollow body casing 1 (made, for example, in ABS) having an inlet section 2, an outlet section 3, and a cut-off section 4. The cut-off section 4 comprises a first portion 5, that extends from the upper wall of the hollow casing 1, and a second portion 6 that extends from the lower wall of the hollow casing 1 so as to define a seat for a gasket 7.

The gasket 7 comprises a gasket casing 8, (made, for example, of ABS) on which a rubber membrane 9 is fastened. In the gasket casing 8 there is a hole 11 drilled as an extension of one of twelve holes 10 present in the membrane 9. In the gasket casing 8 there is also drilled, substantially in a central position, a further through hole 12.

The casing of the valve 1 also comprises a flange 13, comprising a flat part 44 (which defines the seat for the gasket together with the portion 6) and a substantially cylindrical appendix 42 having an interior which defines a cylindrical chamber 21 wherein a steel piston 14 slides). The piston 14 has, at its upper a rubber plug 15 which, when the piston is at the upper end of its stroke (as in FIG. 1) closes a lower mouth of the through hole 12 of the gasket casing 8. A small helical spring 16, reacting against the flange 13, elastically urges the piston 14 in such upper end of the stroke.

Under the flat part 44 of the flange 13 there is a disk 17 of galvanized steel below disk 17 where is a permanent magnet 18 (made, for example, of barium ferrite) and a substantially U-shaped support 19 of galvanized steel. Inside the support 19, round the cylindrical part of the flange 13, there is an electrical coil (coil) 20. Metallic support member 19 has a first leg 19a and a second leg 19b. The first leg 19a and the second leg 19b are perpendicular to a casing longitudinal axis 42x and spaced apart whereby the electrical coil 20 is situated between first leg 19a and second leg 19b. On the bottom of the cylindrical chamber 21, fastened to the support 19 by means of a nut 46, there is a steel anchor pin, provided with a circular groove 23 wherein there is an O-ring 24; the anchor pin 22 also acts as a lower limit for the stroke of the piston 14.

The support 19, the magnet 18, the disc 17 in galvanized steel, the small piston 14 and the anchor pin 22 constitute a magnetic circuit wherein the lines of magnetic flux generated by the coil 20 are concentrated, when an electric current flows through it.

Figure 4:
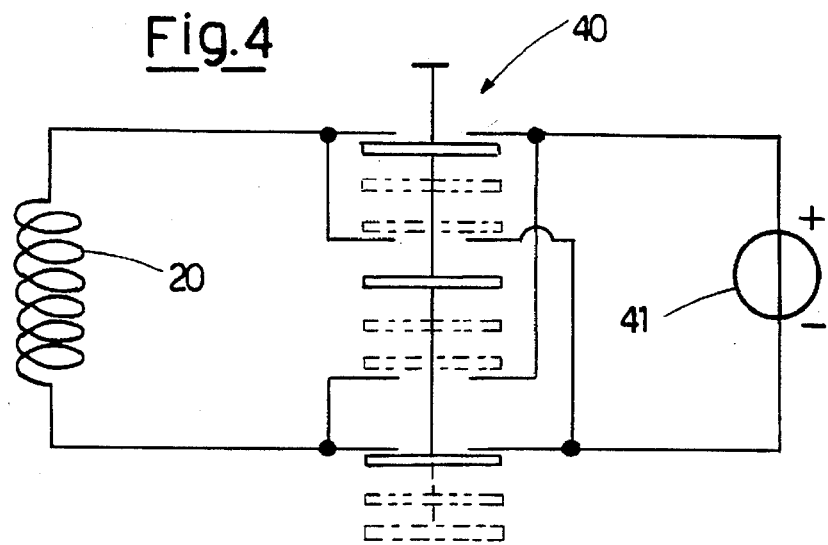
FIG. 4 shows diagramatically an electrical circuit for driving the solenoid valve.

There is shown in FIG. 4 a diagrammatic representation of a possible power circuit for the solenoid valve: the electrical coil 20 is powered, through a switch 40, by a voltage generator 41 (for example a battery). The switch 40 has three operative positions (shown with a continuous line, with a dash-and-dot line and with a dash-and-two-dots line), two of which allow the connection to be made of each end of the coil 20 alternatively to either the positive pole or to the negative pole of the voltage generator 41. In this way, it is possible to invert the direction of the current in the coil 20, and as a consequence to invert the lines of the magnetic flux generated inside the coil 20. When the switch 40 is in the third operative position (shown with a line with one dash and two dots) the coil 20 is disconnected from the voltage generator 41.

When the solenoid valve is in the closed condition, that is when the piston 14 is in the position of the upper end of its stroke shown in FIG. 1, the plug 15 closes the lower mouth of the passing hole 12 in the gasket casing 8. Any water present in the inlet section 2 of the casing 1 cannot flow into the outlet section 3, since the membrane 9 is up against the first and the second portion 5, 6. However, the second portion 6 is shaped so as to define an annular chamber 25 in communication with the inlet setion 2, and thus water present in the inlet section 2, flowing through the holes 10 and 11, penetrates inside a second chamber 26 under the gasket casing 8, defined at its lower end by the flat part 44 of the flange 13 and at its upper end by the gasket casing 8. Since the pressure of the water in this second chamber 26 is equal to the pressure in the inlet section 2 and in the chamber 25, the thrust exerted on the membrane 9 from above is balanced by the thrust exerted on the gasket casing 8 from below. Thus, the gasket 7 is kept in the closed position by a balance of pressures, and the small thrust exerted by the helical spring 16 on the piston 14 ensures that the plug 15 closes the mouth of the hole 12.

Figure 2:
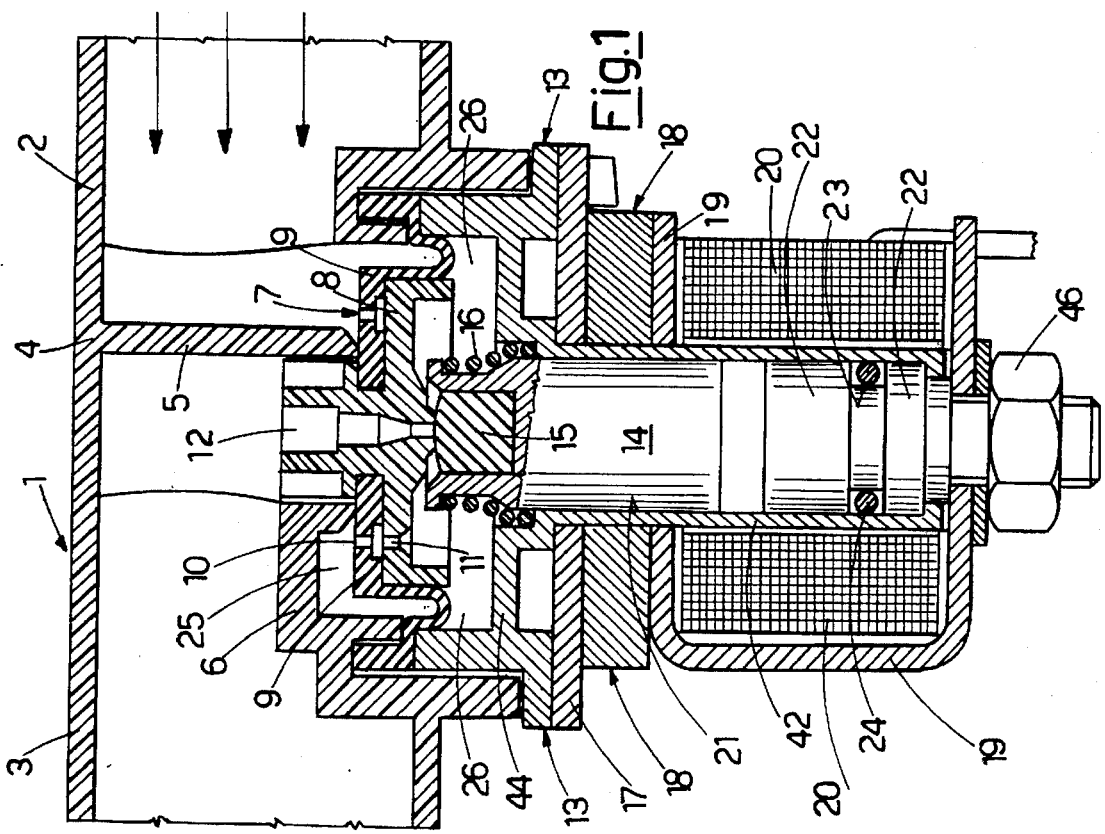
FIG. 2 shows a cross-section of said solenoid valve in a condition intermediate between the closed condition and an open condition.

In order to determine the opening of the solenoid valve, the coil 20 is connected to the voltage generator 41, for example by placing the switch 40 in the position shown with a continuous line in FIG. 4. The current that circulates in the coil 20 generates a magnetic field whose lines of flow are concentrated in the magnetic circuit constituted by the support 19, by the magnet 18, by the small piston 14 and by the anchor pin 22. Such magnetic field determines the downward sliding movement of the small piston 14, that moves to the position of FIG. 2, where it is held by the pin 22. Since the magnet 18 has a stable magnetisation, the coil 20 can be disconnected from the generator 41 (by moving the switch 40 to the position shown with a the dash-and-two-dots line in FIG. 4).

Figure 3:
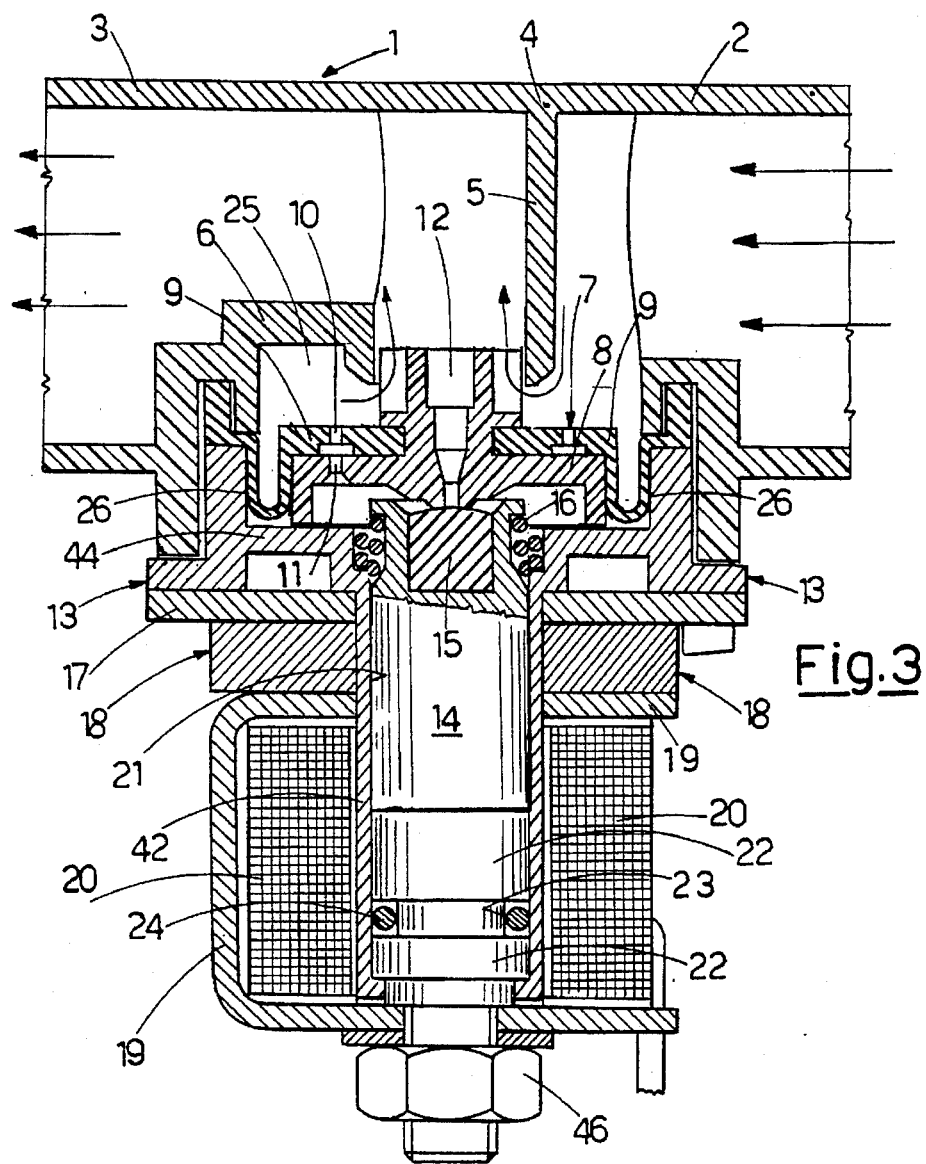
FIG. 3 shows a cross-section of said solenoid valve in the open condition.

With the piston 14 in this position, the lower mouth of the hole 12 in the gasket casing 8 is open, and the chamber 26 is in communication with the outlet section 3 of the casing 1. The pressure exerted by the water on the membrane 9 is no longer balanced by the pressure exerted by the water present in the chamber 26 on the gasket casing 8, and thus the gasket casing 8 nmoves downward, opening a passage between the inlet section 2 and the outlet section 3 of the casing 1 (FIG. 3).

When the solenoid valve is to be closed, the coil 20 is once again connected to the voltage generator 41 by putting the switch 40 in the position shown with a dash-and-dot line in FIG. 4. The direction of circulation of the current in the coil 20 is opposite to that of the previous case, and as a consequence the direction of the magnetic field is also opposite. The small piston 14 is taken back to the position of FIG. 1, wherein it is maintained even after the coil 20 has been disconnected from the voltage generator 41 thanks to the fact that the magnet 18 attracts the piston 14 in a direction opposite to the previous one. The upward movement of the piston 14 determines the upward movement of the gasket casing 8, that is once again taken to the position where the solenoid valve is closed.

I claim:

1. A solenoid valve for an irrigation control unit comprising:

a hollow valve body a cut-off element disposed within the hollow valve body and movable between a valve closed position whereat the cut-off element abuts a seat and a valve open position wherein, the cut-off element having a conduit therein;

a bistable electromagnetic device comprising an electrical coil;

a movable valve member for causing alternatively closing and opening of said conduit a casing having the hollow valve body having a casing, the casing first end, a casing second end, which encloses and secures the valve member within the valve body and a casing longitudinal axis extending between the casing first end and the casing second end, the electrical coil of the bistable electromagnetic device being arranged around the casing;

a piston, responsive to the bistable electromagnetic device for slidably movement within the casing between a piston first position and a piston second position, wherein in the piston first position the piston protrudes from the casing first end for causing the moveable valve member to close the conduit, and wherein in the piston second position the conduit is open;

a metallic support member having a first leg and a second leg, the first leg and the second leg being perpendicular to the casing longitudinal axis and spaced apart whereby the electrical coil is situated between the first leg and the second leg;

a metallic anchor pin secured to the second leg of the metallic support member at the casing second end and extending into the case to serve as a stop element for the piston in the piston second position; and a magnet supported between and in line 50 on a side of the first leg of the metallic support member opposite the electrical coil and a valve casing disk that is supported on the casing adjacent the first end, while surrounding a portion of the casing that encloses the piston.

2. A solenoid valve according to claim 1, wherein said magnet, said electrical circuit, and said piston form at least part of a magnetic circuit.

3. A solenoid valve according to claim 1, wherein said seat is defined in a solenoid valve casing by a plurality of valve casing portions and said cut-off element comprises a cut-off body slidably housed in said seat and including a through hole, and a membrane superimposed over and fastened to said cut-off body, said membrane cooperating with said valve casing portions to ensure a seal between said valve inlet and said valve outlet when said piston is in the piston first position.

4. A solenoid valve according to claim 1, wherein the solenoid valve has a valve inlet and a valve outlet, and wherein said cut-off element defines a chamber, the chamber being in communication with the valve inlet, whereby when the piston is in the piston first position an inlet pressure exerted on the cut-off element by water present at the inlet of the solenoid valve is balanced by a chamber pressure exerted on the cut-off element by the water in the chamber, wherein when the piston is in the piston second position the conduit is opened so that the chamber communicates with the valve outlet, and wherein when the chamber communicates with the valve outlet the inlet pressure exerted on the cut-off element is no longer balanced by the chamber pressure exerted on the cut-off element, whereby the cut-off element is displaced by the thrust of the water present at the valve inlet.

5. A solenoid valve according to claim 1, wherein the bistable electromagnetic device applies a signal to the electrical coil, the application of the signal to the electrical coil generating a first magnetic field which causes the piston to move to the piston first position when the signal has a first polarity, the application of the signal to the electrical coil generating a second magnetic field which causes the piston to move to the piston second position when the signal has a second polarity, and wherein the magnet serves to urge the piston to one of the piston first position and the piston second position until the signal changes polarity.

6. A solenoid valve according to claim 1, wherein the magnet is permanent magnet.

7. A solenoid valve according to claim 1, wherein the metallic support member has a substantially U-shape.

* * * * *